United States Patent [19]

Mallett

[11] 4,180,088
[45] Dec. 25, 1979

[54] WATER SHUTOFF SYSTEM

[76] Inventor: Raymond H. Mallett, P.O. Box 479, Meeker, Colo. 81641

[21] Appl. No.: 857,085

[22] Filed: Dec. 5, 1977

[51] Int. Cl.² .............................................. F16K 31/02
[52] U.S. Cl. ..................................... 137/87; 137/486; 137/487.5; 137/459
[58] Field of Search ..................... 137/486, 487.5, 456, 137/459, 460, 87; 73/40; 251/132

[56] References Cited

U.S. PATENT DOCUMENTS

| 2,647,566 | 8/1953 | Haynie | 251/132 X |
| 3,416,560 | 12/1968 | Bruno | 137/487.5 X |

Primary Examiner—Alan Cohan
Attorney, Agent, or Firm—Allan M. Shapiro

[57] ABSTRACT

Water supply line to the home has a water flow sensor therein and a valve therein. When water flow is sensed, the valve is turned off, as when a leak occurs. Such a leak may be caused by failure of a component in the system, such as a burst pipe or leaky hot water heater, or may be caused by a disaster such as an earthquake.

7 Claims, 1 Drawing Figure

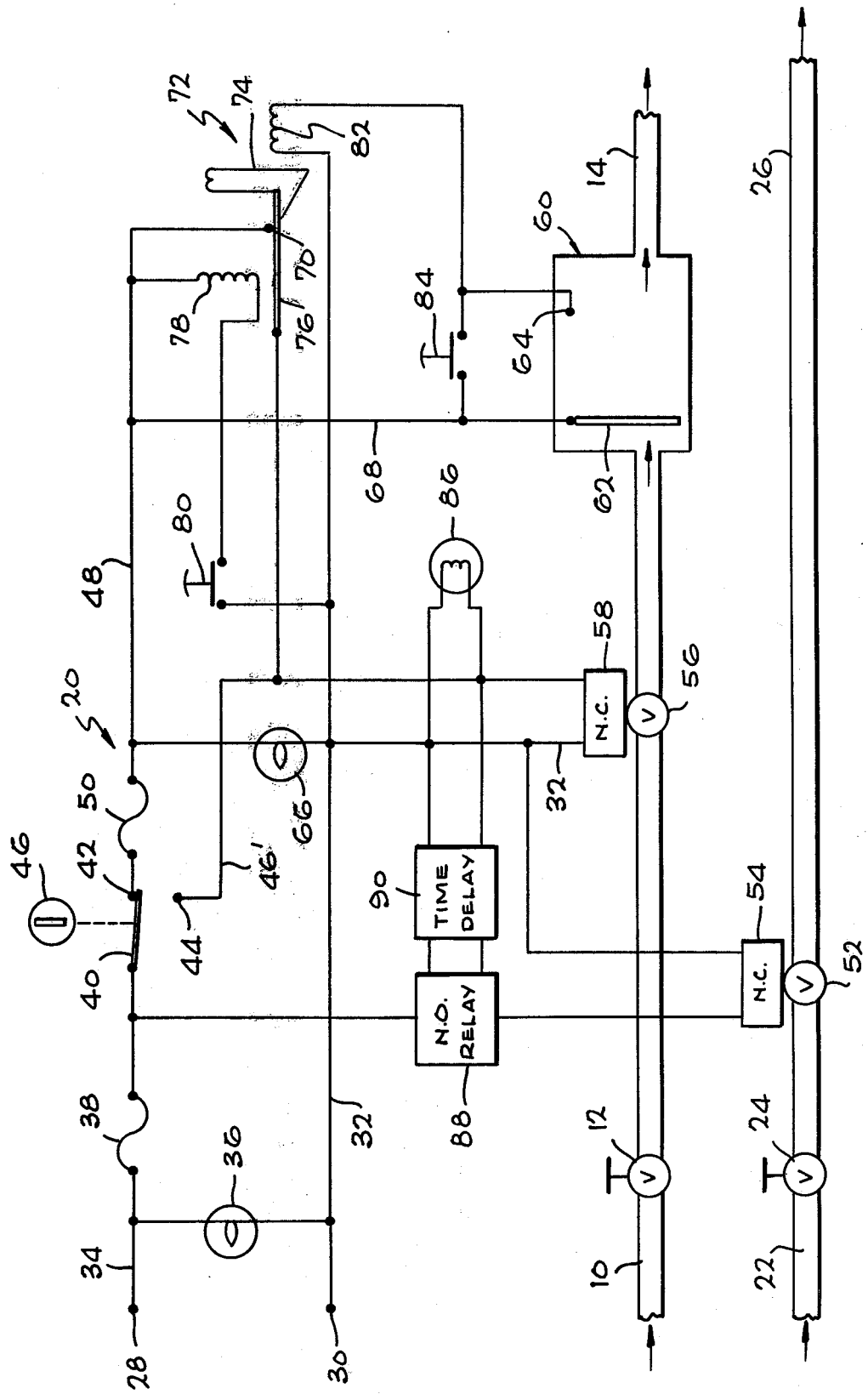

WATER SHUTOFF SYSTEM

BACKGROUND OF THE INVENTION

1. Field of the Invention

This invention is directed to a water shutoff system for automatically shutting off a water system when undesired flow occurs.

2. Description of the Prior Art

Many householders commonly practice the shutting off of the water system when they are leaving their house for a protracted period. However, shutting off the main supply valve is troublesome because of the time involved in the usual inconvenient location of the valve and the usual difficulty in operating the valve. Therefore, few householders perform this chore. The purpose of the chore is to prevent damage should a leak occur while the householder is away. Such damage might be caused by rupture of a frozen pipe, leakage of a hot water heater, water pipe breakage caused by earthquake and the like.

Prior efforts have been made to close a line in response to a break therein. For example, Samain, U.S. Pat. No. 1,466,412 shows a break response valve which is operated by a pendulum sensor. Thomason, U.S. Pat. No. 2,160,766 and Diescher, U.S. Pat. No. 1,956,010, show other mechanically operating break response valves.

Riney, U.S. Pat. No. 2,012,351, shows a gravity closed valve which is released by an electric signal corresponding to excess flow. This and other related prior art does not show structure which meets the present day needs.

SUMMARY OF THE INVENTION

In order to aid in the understanding of this invention, it can be stated in essentially summary form that it is directed to a water shutoff system wherein a flow sensing valve detects flow in a water line and electrically causes a line valve to close. An on-off control switch in the electrical sensing circuit can be located to permit the system to be conveniently turned on and off.

It is thus an object of this invention to provide a water shutoff system which can be connected into a household water line to shut the line off when undesired flow occurs. It is another object to provide a water shutoff system which is responsive to flow in the line and is connected to a selecting switch so that the switch can be turned to a position wherein water can be used and turned into a safety position wherein the flow of water causes closing of the system valve. It is another object to provide a water shutoff system which can protect homes and other water utilizing areas against damage due to breakage in the downstream water line.

Other features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWING

The SINGLE FEATURE of the drawing is a schematic electrical circuit of the preferred embodiment of the water shutoff system of this invention.

DESCRIPTION OF THE PREFERRED EMBODIMENT

Water under pressure is supplied from a source through water supply line 10. The supply line conventionally has a water service shutoff valve 12 by which the flow of water into the house can be shut off and the pressure relieved. Downstream from shutoff valve 12, the water is delivered to the various household systems through distribution line 14. Distribution line 14 is connected to the various usage devices in the house.

In the house, leakage can cause problems and damage. Leakage can occur from various events. Frost may freeze a line to cause it to burst. A flexible water supply line may burst due to age and deterioration. Such supply lines are often employed in supplying water to automatic washing machines in the house, and the hot water hose in such installations has a particular propensity for failure in the leakage mode. Another source of unexpected leakage in household type situations is the aging and failure of the pressure tank of a hot water heater. Due to thermal cycling, such devices have a limited life. Another potential for failure in a water system is the occurence of an earthquake which could flex pipe joints and permit leakage.

To shut off the system when such unwanted leakage occurs when the owner of the house does not desire to use water is the function of the water shutoff system 20 of this invention. As a corollary to the shutoff of water, it is desired to shut off the supply of gas to the hot water heater, at least after a short delay in time, so that the water heater will not be supplied gas when there is no supply of water to it. In the drawing, line 22 is the supply line for gas under pressure. Gas supply line 22 delivers gas through conventional shutoff valve 24 to distribution line 26 by which it is delivered to the hot water heater and other uses.

Water shutoff system 20 is supplied control electricity at terminals 28 and 30. The supply can come from the commercial power supply to the house or it can come from a battery source. A supply from the commercial lines is preferable because the fail-safe character of system 20 would shut off the flow of water and gas in the event of power failure.

Terminal 30 is connected to ground line 32, while terminal 28 is connected to supply line 34. Signal lamp 36 is connected between lines 32 and 34, and when illuminated, shows that there is electric power being supplied to the system. Fuse 38 protects the supply against shorts. Selector switch 40 is movable between switch contacts 42 and 44. It is manually controlled and may be controlled by a key-lock system 46 so that the switch can be locked in either position. Function line 46' is connected to several control devices to cause their activation when electric power is supplied thereto. Function line 46' is connected to switch contact 44 so that electric power is supplied to the function line when the switch is in the lower position. Since no sensing of flow is taking place when the switch is in the lower position, this is considered the non-automatic position. When the switch 40 is in the upper position shown, it is considered to be in the automatic position, and it supplies electric power to the automatic line 48. Fuse 50 is positioned in the automatic line to protect the circuitry from excess current.

Valve 52 is positioned in gas distribution line 26 downstream of shutoff valve 24. It is controlled by solenoid 54 in such a manner that valve 52 is normally closed. Similarly, valve 56 is positioned in water distribution line 14 downstream of shutoff valve 12. Valve 56 is controlled by solenoid 58 in such a manner that the valve 56 is normally closed, when the solenoid is not energized. Solenoids 54 and 58 are both connected to ground line 32.

Water flow sensor 60 is connected in distribution line 14 close to shutoff valve 12 and before branches in the distribution line. Water flow sensor 60 has vane 62 swingably positioned therein. It hangs down, as shown, when there is no water flow. It is positioned in the flow stream so that, when there is water flow, it swings up to make contact with contact 64. The making of such contact indicates water flow. By proper design, water flow sensor 60 can be made quite sensitive to any water flow. Flow sensors such as are shown in Stonich U.S. Pat. No. 3,511,267 or in Borden, U.S. Pat. No, 2,577,564, can be used as the flow sensor 60.

Lamp 66 is connected between the automatic line 48 and ground line 32 so that it is illuminated when the automatic line is energized. Automatic line 48 is connected through line 68 to vane 62. Automatic line 48 is also connected to contact 70 of latching relay 72. Latch 74 holds switch bar 76 up against contact 70. Switch bar 76 is connected to function line 46'.

Reset coil 78 is connected to automatic line 48 and through reset pushbutton 80 to ground line 32. Reset coil 78 is positioned so that, when it is energized, it raises switch bar 76 up to the engaged position under latch 74 and retained in the engaged position when it remains in contact with contact 70.

Release coil 82 is connected to contact 64 and ground line 32 and is positioned so that, when it is energized, it withdraws latch 74 releasing switch bar 76 so that it moves away from contact 70 and deenergizes function line 46'. Test pushbutton 84 is connected in parallel to sensor 60 so that release coil 82 can be energized without the flow of water.

Lamp 86 is connected between function line 46 and ground line 32 to show when the function line is energized. These lines are also connected to solenoid 58 so that water valve 56 is open when the function line is energized, and it is closed when it is deenergized.

Normally open relay 88 is connected between supply line 34 and solenoid 54. The other side of the solenoid is connected to the ground line. Time delay 90 is connected between relay 88 and the function and ground lines. Time delay 90 delays the opening of relay 88 for a predetermined period of time after function line 46 is deenergized.

When it is desired that water be used in the usual functions of the household, the switch 40 is turned downward to energize function line 46'. Under these conditions, signal lamp 36 is illuminated to show the presence of line power, and lamp 86 is illuminated to show energization of the function line which means energization of solenoids 54 and 58 with the consequent open positions of their gas and water valves. In this arrangement, water and gas can be used in the conventional way.

Under those circumstances where no water usage is expected, such as at night or when the householder is away, then selector switch 40 is moved to the upper position where automatic line 48 is energized. This energization is indicated by lamp 66. Reset button 80 is actuated to raise switch bar 76 so that function line 46' is energized. Water pressure and gas pressure stay on. Should there be a short time when function line 46' is not energized, such as when selector switch 40 is changed or when it is changed to the automatic line and latching relay 72 is not yet latched, then time delay 90 maintains normally open relay 88 energized for a short time, such as 5 minutes, so that gas valve 52 is not shut off until after the short time is expired. This prevents the automatic equipment in the gas hot water heater from shutting off and the pilot is maintained through these transitions.

Under these conditions of automatic sensing, should water flow occur, then vane 62 swings against contact 64 to energize release coil 82. This drops switch bar 76 so that the automatic line is deenergized. Lamp 86 goes out, valve 56 is closed, and after the previously discussed time delay, gas valve 52 is also closed. In this way, the house is protected by shutting off these supplies under circumstances where damage could occur.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A shutoff system for shutting off a fluid line in response to fluid flow through the line, said shutoff system comprising:

a normally closed electrically controlled valve for connection into the fluid line so that, upon non-energization and closing of said valve, fluid flow through the fluid line is prevented, and upon energization of said valve, said valve is opened in response to an electrical signal;

fluid flow sensing means for serial connection in the fluid line with said valve for sensing fluid flow, said sensing means producing an electrical signal in response to fluid flow through said sensing means; and an electrical circuit having an automatic line, said automatic line interconnecting said sensing means and said valve, said automatic line having a latching relay connected to said sensing means and said valve so that when said latching relay is closed energization of said automatic line puts said automatic line in automatic mode so that the sensing of fluid flow by said fluid flow sensor causes unlatching of said latching relay and closing of said valve, said circuit also having a function line connected to said valve so that when said function line is energized by said circuit the sensing of fluid flow does not cause valve closing.

2. The system of claim 1 wherein said fluid flow sensor is a liquid flow sensor and said valve is a liquid valve.

3. The system of claim 2 wherein said electrical circuit has a selector switch therein, said selector switch being positionable in a first position to energize said automatic line and said flow sensor and being positionable in a second position to energize said function line, said function line being connected to said electrical controller of said valve.

4. The system of claim 1 wherein said flow sensor is a water flow sensor and said valve is a water valve and in addition there is a gas valve, said gas valve being connected to be actuated by said function line.

5. The system of claim 4 wherein said gas valve is a normally closed valve having an electric actuator and there is a time delay device interconnected between said function line and said gas valve electric actuator so that said gas valve is maintained open for a period of time after said water valve is closed.

6. The system of claim 1 wherein said latching relay has a release solenoid for releasing the latch of said latching relay and said release solenoid is connected to said flow sensor.

7. The system of claim 6 wherein said latching relay has a reset coil for closing and latching said relay, said reset coil having a reset switch in series therewith so that said latching relay can be latched.

* * * * *